United States Patent [19]
Reeder et al.

[11] Patent Number: 5,729,596
[45] Date of Patent: Mar. 17, 1998

[54] SECURITY SYSTEM

[75] Inventors: Stephen M. Reeder, Ipswich; Jonathan Hopkins, Saxmundham; David McGlaughlin, Ipswich, all of England

[73] Assignee: British Telecommunications public limited company, London, England

[21] Appl. No.: 243,659

[22] Filed: May 17, 1994

[30] Foreign Application Priority Data

Mar. 28, 1994 [EP] European Pat. Off. ............. 94302211

[51] Int. Cl.⁶ ................................................ H04M 11/00
[52] U.S. Cl. ........................ 379/102.04; 379/90.01; 379/106.01; 340/531; 340/825.36
[58] Field of Search ........................ 379/40, 44, 45, 379/49, 50, 51, 39, 106, 142, 95, 188, 189, 196, 197, 199, 102.04, 102.01, 102.02, 102.03; 340/531, 568, 687, 825.32, 825.36, 825.16, 825.49; 348/7, 6, 12, 13

[56] References Cited

U.S. PATENT DOCUMENTS

| | | | |
|---|---|---|---|
| 4,942,599 | 7/1990 | Gordon et al. | 379/93 |
| 5,021,779 | 6/1991 | Bisak | 340/825.69 |
| 5,022,067 | 6/1991 | Hughes | 379/95 |
| 5,351,289 | 9/1994 | Logsdon et al. | 379/199 |
| 5,406,269 | 4/1995 | Baran | 379/40 |
| 5,406,619 | 4/1995 | Akhteruzzaman et al. | 379/95 |
| 5,410,326 | 4/1995 | Goldstein | 348/7 |

FOREIGN PATENT DOCUMENTS

0549128 A2  6/1993  European Pat. Off. .

OTHER PUBLICATIONS

Bloom et al., "A Network Solution for Improved Security for Computer Access" Computer Communications for the 90's, Nov. 1988, Amsterdam NL, pp. 379–382.

*Primary Examiner*—Stella Woo
*Attorney, Agent, or Firm*—Nixon & Vanderhye P.C.

[57] ABSTRACT

Electrical appliances each include an identity module which carries a code. Whenever mains electrical power is reconnected to one of the appliances, FSK signals are sent via the main electricity circuit to a security mains-telephone transfer point module which then causes a call to be set up via a telephone network to a remote security unit. The remote security unit uses customer line identity (CLI) signals from a telephone network interface to identify a code which it returns via the telephone network to the security mains-telephone transfer point module associated with the appliance site. The security mains-telephone transfer point module forwards the received code using FSK signals to the requesting appliance by way of the mains electrical circuit. If an incorrect code (or no code) is received, the identity module in the appliance inhibits the supply of power to its operational circuits.

30 Claims, 2 Drawing Sheets

SECURITY SYSTEM

BACKGROUND OF THE INVENTION

1. Field of the Invention

The present invention relates to a security system and more particularly to a security system for electrically powered apparatus.

2. Related Art

Items of substantial value are to be found in most homes, schools and offices. Such items include not only personal computers, video recorders, hi-fi equipment and televisions but also so-called white goods such as freezers, refrigerators, washing machines and cooking equipment.

All of these transportable goods are attractive to thieves, some of whom have emptied entire houses during the absence of their occupiers.

It is known that security coding of items can discourage theft. For example many radios installed in vehicles will not operate after a power supply interruption unless a correct security code is entered.

Clearly such a system can be applied to other apparatus such that the apparatus is rendered unusable until the correct security code is entered. Although such systems improve the security of the coded apparatus, notwithstanding the inclusion of multiplying delays between attempts, the code may be broken by "trial and error" over a period of time.

Similarly, personal computers may be programmed to require password entry prior to use. However, skilled programmers can cause the computer to restart using a different program and may in any event discover the password.

BRIEF SUMMARY OF THE INVENTION

The present invention seeks to provide an improved security system for use in electrically powered portable or transportable apparatus.

According to one aspect of the present invention there is provided a security system comprising access means to cause seizure of a connection to a telephone exchange and means in the exchange to identify the source of seizure and to generate coded signals identifying the source, characterised in that on request from the access means the coded signals are transmitted to the connection for comparison with a previously stored code in requesting apparatus.

Preferably the access means is further characterised by the inclusion of transceiver means to receive request signals from a plurality of requesting apparatuses and means to transmit the coded signals to such requesting apparatuses whereby only one access means requires access to a connection to a telephone exchange for providing signals to the plurality of requesting apparatuses.

The transceiver means may be responsive to signals transmitted on an electrical power line and may be arranged to transmit signals to the electrical power line. Such signals may comprise frequency shift keyed signals.

According to a further aspect of the invention in electrically powered apparatus there is provided storage means for holding a code, means to compare the stored code with a received code and control means to prevent power being supplied to operate the apparatus unless a received code and the stored code are compatible characterised in that on reconnection of the apparatus following interruption of electrical power the control means causes a request for identity to be transmitted.

Preferably the request for identity is in the form of signals transmitted on the electrical power line to which the apparatus is connected, and code signals forming the identity are received by way of the power line. Such signals may comprise frequency shift keyed signals.

The control means may further be arranged, on receipt of an incompatible identity to return signals indicating its stored code whereby its location may be identified by remote apparatus.

Further optional aspects of the invention including initial coding and subsequent decoding of electrically powered apparatus equipped with the system will be apparent from the description and claims hereinafter.

BRIEF DESCRIPTION OF THE DRAWING

A security system in accordance with the invention will now be described by way of example only with reference to the accompanying drawings of which.

DETAILED DESCRIPTION OF EXEMPLARY EMBODIMENTS

Figure 1:
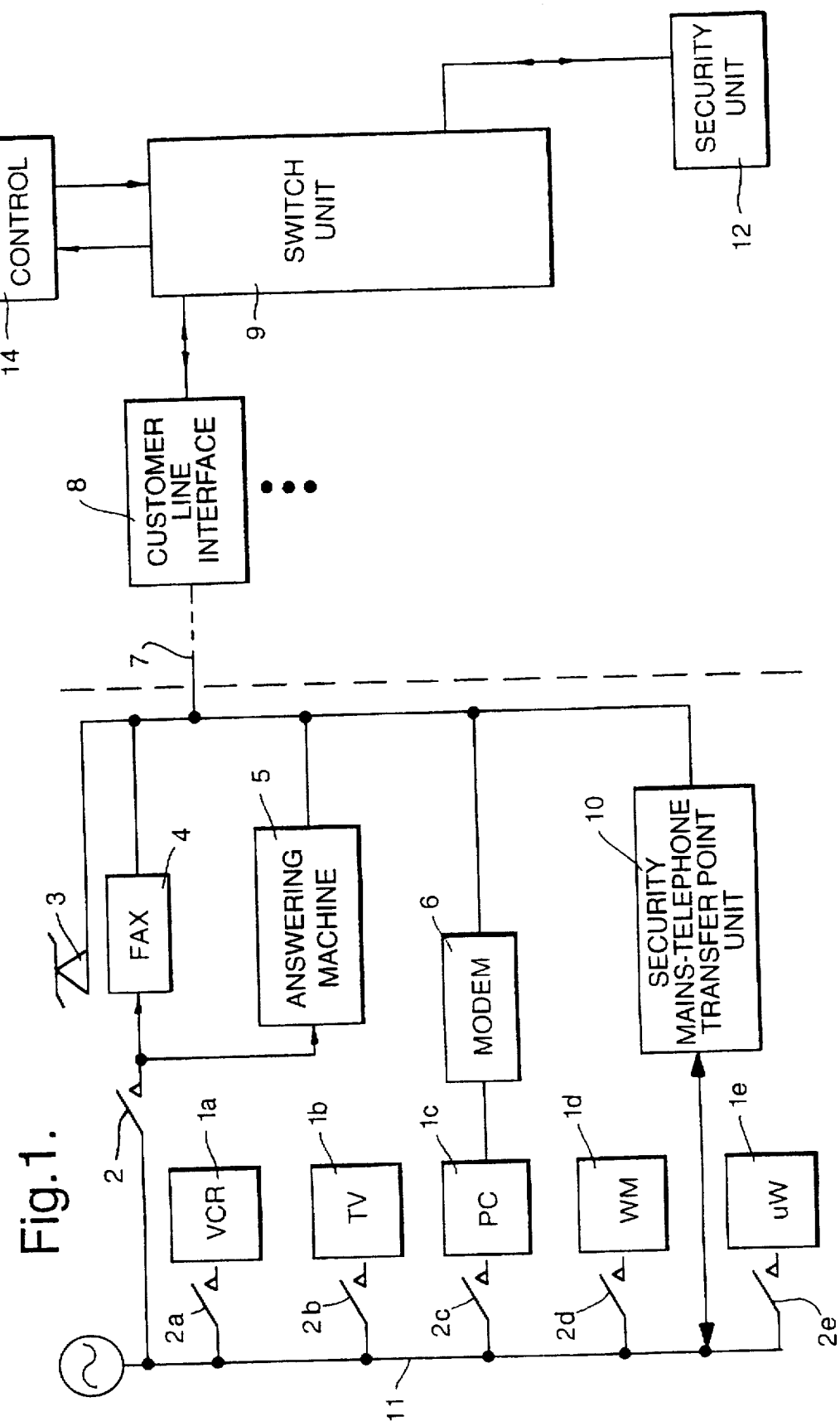
FIG. 1 is a block schematic diagram of a typical domestic security system.

Referring first to FIG. 1, a number of mains electricity powered apparatuses, such as a video-recorder or VCR 1a, television set or TV 1b, personal computer or PC 1c, washing machine or WM 1d and microwave oven or μW 1e are shown for illustrative purposes only. These domestic apparatuses 1a through 1e are connected to the house electricity main circuit 11 through plug and socket arrangements, schematically shown as switch contacts 2a through 2e.

Telephone equipment such as a telephone 3, facsimile transmission apparatus or Fax 4, answering machine 5 and a modem 6 may also be present connected by way of suitable network terminating equipment (not shown) to a telephone line 7 to a telephone exchange.

The line 7 is connected by way of a customer line interface 8 to a switch unit 9 in known manner. The customer line interface 8 is of the kind which provides signals identifying the customer line (sometimes called CLI). Such signals are used by the telecommunications systems to arrange appropriate charging for telephone services and, in some cases, may be passed across the network to remote switching units (not shown).

As thus far described the domestic and telecommunications arrangements are not dissimilar to many existing arrangements.

However, in the system of the invention, a security mains-telephone transfer point unit 10 is connected to the electricity ring main circuit 11 and also to the line 7. In the telecommunications network, but not necessarily in the local switching centre, a security unit 12 is provided. Interaction between the units 10 and 12 will become apparent from the description hereinafter.

Figure 2:
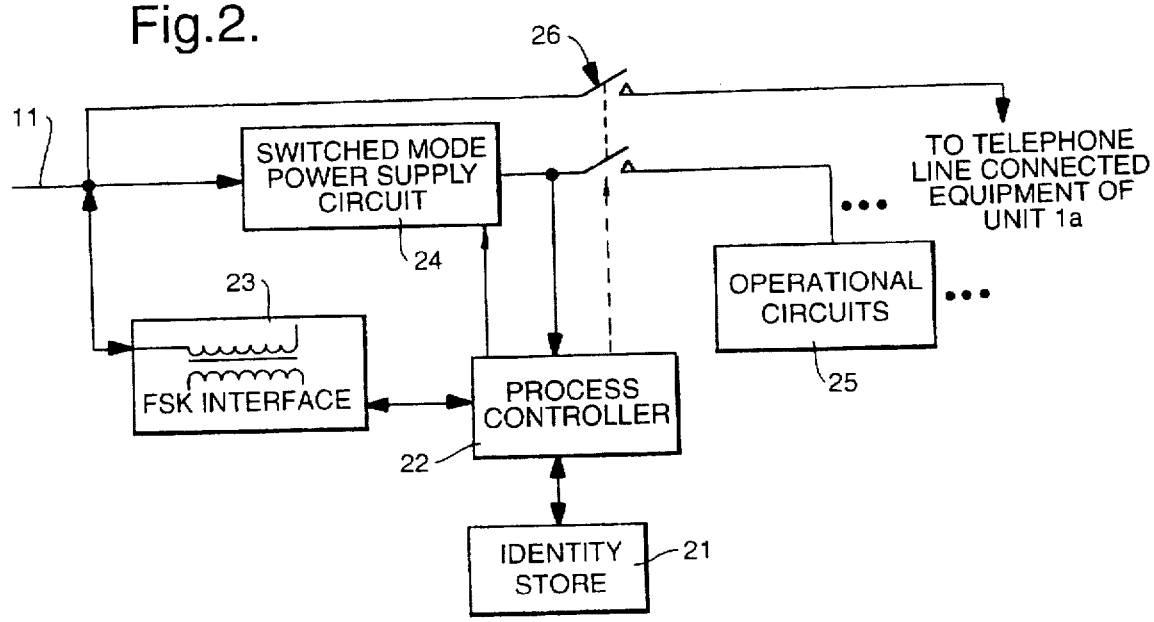
FIG. 2 is a block schematic diagram of a security module included in each of the domestic apparatuses shown in FIG. 1.

Referring now to FIG. 2, during manufacture (or possibly by retrospective fitting) the domestic apparatuses 1a through 1e of otherwise conventional design include an identity store 21 and a process controller 22 (for example a microprocessor) both of which may exist for use for other purposes in the apparatus.

When the apparatus is first provided with mains power from the appropriate one of switches 2a–2e, power from mains connection is not passed to operational circuits 25 of the apparatus because a switch 26 is not closed. A power supply circuit 24 (which may be the normal power supply circuit for the particular apparatus) powers up the process controller 22 which causes frequency shift keyed signals to be sent through an FSK interface 23 onto the electricity main 11 in known manner.

Figure 3:
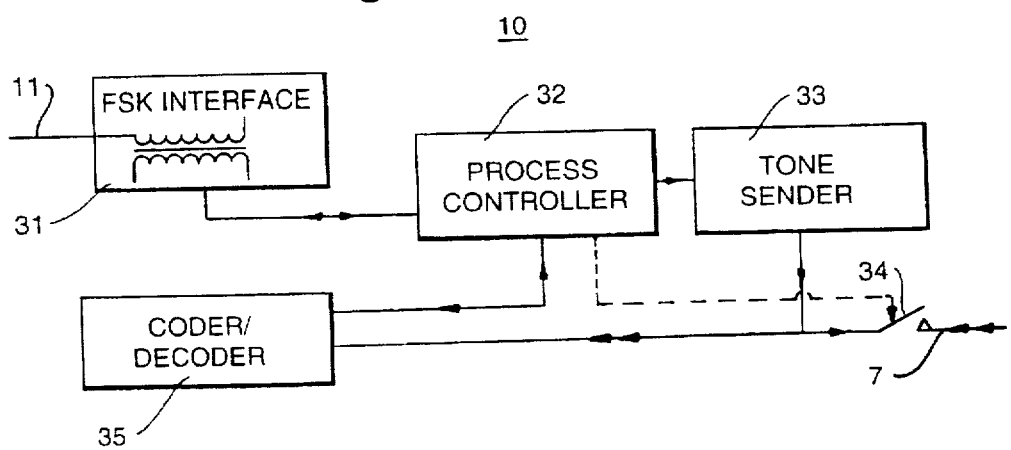
FIG. 3 is a block schematic diagram of the mains-telephone transfer point shown in FIG. 1.

Now considering FIG. 3 as well, the security mains-telephone transfer point unit 10 receives the FSK signals from the electricity main 11 by way of an FSK interface 31. A process controller 32, on identifying the signals as a connection request causes the telephone line to be seized using switch 34. A tone sender 33 is now used to send signals to the line 7 which cause a path to be set up through the telecommunications network (as represented by the switch unit 9 and its associated control 14) to the security unit 12. This call to the security unit 12 is referred to below as a "Who am I?" signal.

The security unit 12 receives CLI signals from the customer line interface 8 which signals uniquely identify the source of the request. Using a coding algorithm, the security unit 12 causes signals to be returned over the usual telephone network including switch unit 9 which signals represent a numerical or alpha-numerical code unique to the particular customer line 7, such as a scrambled version of the telephone number.

The signals are decoded by a coder-decoder 35 (FIG. 3) and the process controller 32 causes the received code to be transmitted across the FSK interface 31 to the FSK interface 23 of the requesting apparatus 1.

The process controller 22 compares the received identity with that held in the identity store 21 and, if compatibility is confirmed causes the switch 26 to close to allow the operational circuits 25 to function.

If identity between the received code and the stored code is not achieved then the process controller 22 does not allow power to be provided to the operational circuits. Thus if coded apparatus is stolen the thief will be at least inconvenienced in seeking to use it.

In a further development, the process controller 22 may be arranged, on receipt of an invalid code, to return signals via the security mains-telephone transfer point unit 10 to the security unit 12 indicating that an invalid code has been received. The security unit 12 may accordingly be used to identify the location of potentially stolen goods. Further, the process controller 22 may cause the actual stored identity to be transmitted such that the original source of the apparatus can be checked.

This latter capability may be used to advantage by manufacturers and others to maintain a stockist of so-called white and brown goods in a manner hereinafter described.

As will be appreciated it is not the aim of the invention to inhibit bona-fide transfer or trade in apparatus. Thus, on initial supply, it is expected that the identity store will be preprogrammed with a blanking code which is "known" by the process controller 22. So long as the blanking code is present, each connection of power to the apparatus will still cause the controller 22 to send a "Who am I?" signal by way of the FSK Interface 23. However if the particular premises is not equipped with a security mains-telephone transfer point unit 10, no response will be received and the apparatus will appear to function as if the protective circuit was not present.

If the premises are equipped, then the security code unique to the particular CLI will be received. The controller 22 now sends a second "Who am I?" signal and again receives the security code. Assuming that the same code is received at least twice in succession the controller 22 causes the new code to be stored in the identity store 21 and future disconnection and reconnection of the newly coded apparatus will only succeed if the correct security code is present.

In order to protect manufacturers, wholesalers and bona-fide retailers, controller 22 on receipt of a first security code subsequent to its known blanking code may cause its known blanking code to be transmitted. Such a code may be manufacturer unique or may indeed include manufacturer and machine serial number uniqueness. On receipt of a manufacturer code, the security unit 12 may be arranged to interrogate a manufacturer's database to ensure that the goods have validly passed to the current end-user. If so, signals to cause updating of the stored identity may be transmitted. If not then the location of the apparatus may be known.

Of course, there are times when goods need to be moved from their secured location for valid reasons. If this is necessary then the bona-fide owner uses the telephone 3 to establish a direct call to the security unit 12 and transmits a personal identification number (PIN). The security unit 12 commences a timer of, say, five minutes duration and any "Who am I?" requests received from the particular CLI result in a special code being returned to cause the process controller 22 and the identity store 21 to be returned to a blanked state. Thus, the owner may disconnect power from a unit which is to be transferred, effect a telephone call and PIN transmission as described and reconnect power to the apparatus which may then be removed from the specific premises. However, as has been noted above, the blanked state identity marking will remain with the apparatus until the procedure of re-coding occurs. On recoding the blanked state code may be checked as hereinbefore described.

In a further feature of the invention, the "Who am I?" signal may include coding identifying the type of apparatus originating the request and facilities may be provided in the security unit 12 to enable requests from specified apparatus to be refused in particular periods. Thus, if a parent does not wish children to have access to, say, a video player, he or she may indicate this by calling the security unit 12, entering a PIN and tone signals from the telephone keypad, and no signal will be then returned if a video-player "Who am I?" request is received.

Such prohibition may be preprogrammed to terminate at a particular time or may await cancellation by further telephoning and PIN entry.

Although the invention has been described by reference to a domestic installation, it will be realized that it is equally applicable to office, school or other commercial environments. However, as may be realized, where multiple power circuits 11 are present additional security mains-telephone transfer point units 10 may be needed.

Further, while the security unit 12 as described herein is part of the telephony network, it will be realized that other dial-up links may be used always provided that a unique identity of the origination of the call is provided.

It will also be appreciated that apparatus such as the facsimile machine (4 of FIG. 1) or answering machine (5 of FIG. 1) which are adapted for connection to both the mains source 11 and to the telephone line 7 may include the ability to interface with the security unit 12 directly without interfacing through the security mains-telephone transfer point unit 10.

What is claimed is:

1. Electrically powered apparatus including:

storage means for holding a stored identity code, means connected to said storage means, to compare the stored identity code with a received identity code, and control means connected to the means to compare and between the apparatus and a source of electrical power to prevent power being supplied to operate the apparatus unless the received identity code and the stored identity code are compatible, said control means causing a request to be transmitted to a remote location for a return transmission of said received identity code on reconnection of the apparatus following interruption of electrical power.

2. Electrically powered apparatus as in claim 1 wherein the control means is arranged, upon receipt of an incompatible code, to return signals indicating said stored code.

3. Electrically powered apparatus as in claim 1 wherein the control means inhibits supply of electrical power to operational circuits of the apparatus unless the received code and the stored code are compatible.

4. Electrically powered apparatus as in claim 1 wherein the control means is arranged to forward signals which identify the type of apparatus which is requesting identity signals.

5. A security system comprising:

access means including a first connector connected to a telephone exchange line and a second connector connected to an electrical power supply line;

said access means including control means, a first interface means connected between said second connector and said control means and a second interface means connected between said control means and said first connector;

said control means being responsive to signals received on said electrical power supply line to cause said second interface means to transmit request signals through said telephone exchange line to a telephone exchange;

said telephone exchange including means responding to said request signals to cause coded identity signals to be transmitted through said telephone exchange line to said control means; and said control means causing frequency shift keyed signals corresponding to said coded identity signals to be transmitted to said electrical power supply line.

6. Electrically powered apparatus including:

storage means for holding a stored code, means connected to said storage means to compare the stored code with a received code, and control means connected to the means to compare and between the apparatus and a source of electrical power to prevent power being supplied to operate the apparatus unless the received code and the stored code are compatible;

said control means causing a request for identity signals to be transmitted to a remote location on each reconnection of the apparatus following interruption of electrical power;

wherein the request for identity is in the form of signals transmitted on an electrical power line to which the apparatus is connected via the means to prevent power being supplied.

7. Electrically powered apparatus including:

storage means for holding a stored code, means connected to said storage means to compare the stored code with a received code and control means connected to the means to compare and between the apparatus and a source of electrical power to prevent power being supplied to operate the apparatus unless the received code and the stored code are compatible, said control means causing a request for identity signals to be transmitted to a remote location on each reconnection of the apparatus following interruption of electrical power;

the received code signals being received by way of an electrical power to which the apparatus is connected.

8. Electrically powered apparatus including:

storage means for holding a stored code, means connected to said storage means to compare the stored code with a received code and control means connected to the means to compare and between the apparatus and a source of electrical power to prevent power being supplied to operate the apparatus unless the received code and the stored code are compatible, said control means causing a request for identity signals to be transmitted to a remote location on each reconnection of the apparatus following interruption of electrical power;

wherein the request for identity is in the form of signals transmitted on an electrical power line to which the apparatus is connected via the means to prevent power being supplied.

9. A security system comprising:

a first connector for connection to an electrical power circuit, a second connector for connection to a telephone line of a telephone network, and access means responsive to request signals modulated onto and received from the electrical power circuit to cause seizure of the telephone line, the telephone network including means responsive to seizure of a telephone line connected thereto to generate calling line identity (CLI) signals identifying the line seized, and security means in the telephone network responsive to the CLI signals to transmit coded signals derived therefrom to the seized telephone line, a representation of said coded signals being modulated by said access means onto the electrical power circuit as an identity code for use by requesting apparatus connected to the electrical power circuit.

10. A security system as in claim 9 in which the access means comprises transceiver means for receiving request signals from at least two different requesting apparatuses connected to said electrical power circuit and for transmitting signals received from the seized telephone line to each of said requesting apparatuses through the electrical power circuit.

11. A security system as in claim 10 in which each requesting apparatus includes means to transmit coded signals corresponding to respective identity codes stored therein.

12. A security system as in claim 11 in which the security means includes means responsive to respective identity code signals to identify data defining a location at which the requesting apparatus has had a valid connection earlier in time than a currently effected line seizure.

13. A security system as in claim 12 in which the security means includes comparison means to access data defining a previous location determined from said valid connection data and data defining a current location determined from data received via a current line seizure to check validity of the current location of the requesting apparatus.

14. A security system as in claim 9 in which each requesting apparatus includes means to transmit coded signals corresponding to respective identity codes stored therein.

15. A security system as in claim 14 in which the security means includes means responsive to respective identity code signals to identify data defining a location at which the requesting apparatus has had a valid connection earlier in time than a currently effected line seizure.

16. A security system as in claim 15 in which the security means includes comparison means to access data defining a previous location determined from said valid connection data and data defining a current location determined from data received via a current line seizure to check validity of the current location of the requesting apparatus.

17. A security system as in claim 9 wherein the security means is responsive to signals received by way of the telephone line to accept instructions to deny a response to specific requesting apparatuses for a predetermined period of time or until receipt of further signals cancelling said instructions.

18. A security system as in claim 9 wherein the security means is responsive to signals received over the telephone line to start a predetermined time period during which signals received from a requesting apparatus cause return of special coding signals which effect identity modification in that requesting apparatus.

19. A security system comprising:
   a first connector for connection to an electrical power circuit,
   a second connector for connection a telephone line of a telephone network, and
   access means responsive to request signals received from the electrical power circuit to cause seizure of the telephone line,
   the telephone network including means responsive to seizure of a telephone line connected thereto to generate calling line identity (CLI) signals identifying the line seized, and
   security means in the telephone network responsive to the CLI signals to transmit coded signals derived therefrom to the seized telephone line, said coded signals comprising an identity code for use by requesting apparatus connected to the electrical power circuit;
   wherein the transfer of information from requesting apparatus to the access means is effected by frequency shift keyed signals supplied to the electrical power circuit by a requesting apparatus.

20. A security system for at least one electrically powered apparatus located at a first site and having a local security module connectable to a remote security unit via a telephone line connection in a telephone network which generates calling line identity (CLI) signals, said security system comprising:
   a controllable switched-mode power supply circuit associated with each said apparatus at said first site and connected to supply electrical power thereto electrically controlled to an "on" state via a control input;
   a controller associated with each said apparatus at said first site and connected to control its respective switched-mode power supply circuit in response to coded signals received from said remote security unit via said local security module;
   said local security module being connected to seize a telephone line connection to said remote security unit in response to request signals received from the controller of an apparatus, and
   said remote security unit including means for returning said coded signals to said local security module as a function of CLI signals received in conjunction with said request signals.

21. A security system as in claim 20 further including:
   a local electrical power circuit connected to supply electrical power to said apparatus and to said local security module, and
   means for communicating said request signals and coded signals between a said controller and said local security module via said commonly connected local electrical power circuit.

22. A security system as in claim 20 wherein at least one said apparatus is also connected to directly seize a telephone line connection for other purposes after said switched-mode power supply has been placed in an "on" state.

23. A security system as in claim 20 wherein said remote security unit includes means accessible via the telephone network for selectively thereafter preventing power supply to a particular apparatus until a further predetermined condition occurs.

24. A security system comprising:
   access means including a first connector connected to a line of a telephone exchange and a second connector connected to an electrical power supply line;
   said access means including control means, a first interface means connected between said second connector and said control means and a second interface means connected between said control means and said first connector;
   said control means being responsive to signals received on said electrical power supply line to cause said second interface means to transmit request signals through said telephone exchange;
   said telephone exchange including means responding to said request signals to cause coded identity signals to be transmitted through said line of the telephone exchange to said control means; and
   said control means causing corresponding coded identity signals to be re-transmitted to said electrical power supply line.

25. A security system as in claim 24 wherein:
   said telephone exchange includes means to generate customer line identity (CLI) signals which signals identity said line of the telephone exchange; and
   security means connected to said telephone exchange is responsive to said CLI signals to generate said coded identity signals.

26. A security system as in claim 25 wherein the security means is responsive to signals received from the telephone exchange to start a predetermined time period during which signals received from a requesting apparatus cause return of special coding signals which effect identity modification in that requesting apparatus.

27. A security system as in claim 25 wherein:
   said control means is responsive to further signals received from said first interface means to cause said second interface means to transmit apparatus identity signals; and said security means uses said apparatus identity signals to identify a previous source or location of signaling apparatus.

28. A security system as in claim 27 wherein the security means is responsive to signals received from the telephone exchange to accept instructions to deny a response to specific requesting apparatuses for a predetermined period of time or until receipt of further predetermined cancellation signals.

29. A security system as in claim 27 wherein:

said security means is responsive to said apparatus identity signals to access data relating to said previous source or location and to perform a validity check of a location identified from said CLI signals before returning said coded identity signals to said control means.

30. A security system comprising:

access means including a first connector connected to a telephone exchange line; and a second connector connected to an electrical power supply line;

said access means including control means, a first interface means connected between said second connector and said control means and a second interface means connected between said control means and said first connector;

said control means being responsive to signals received on said electrical power supply line to cause said second interface means to transmit request signals through said telephone exchange line to a telephone exchange;

said telephone exchange including means responsive to said request signals to cause coded identity signals to be transmitted through said telephone exchange line to said control means; and said control means causing signals corresponding to said coded identity signals to be transmitted to said electrical power supply line.

* * * * *